(12) United States Patent
Isoda et al.

(10) Patent No.: US 10,205,485 B2
(45) Date of Patent: Feb. 12, 2019

(54) COMMUNICATION APPARATUS AND MOTOR CONTROL APPARATUS

(71) Applicant: Panasonic Intellectual Property Management Co., Ltd., Osaka (JP)

(72) Inventors: Mineaki Isoda, Osaka (JP); Masahito Hidaka, Osaka (JP); Koji Kuyama, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/023,382

(22) PCT Filed: Sep. 18, 2014

(86) PCT No.: PCT/JP2014/004809
§ 371 (c)(1),
(2) Date: Mar. 19, 2016

(87) PCT Pub. No.: WO2015/045338
PCT Pub. Date: Apr. 2, 2015

(65) Prior Publication Data
US 2016/0204831 A1    Jul. 14, 2016

(30) Foreign Application Priority Data

Sep. 30, 2013   (JP) .................. 2013-203334

(51) Int. Cl.
*H03K 7/08*        (2006.01)
*G01R 27/02*       (2006.01)
(Continued)

(52) U.S. Cl.
CPC .......... *H04B 3/544* (2013.01); *H04L 5/1415* (2013.01); *H04L 7/0016* (2013.01); *H04L 25/4902* (2013.01)

(58) Field of Classification Search
CPC . H04L 7/042; H04L 51/38; H04L 5/16; H04L 25/0264; H04L 25/0272;
(Continued)

(56) References Cited

U.S. PATENT DOCUMENTS 5,198,701 A * 3/1993 Davies ................... G05F 1/463
                                                327/513
5,377,328 A * 12/1994 Benham .............. G06F 13/4045
                                                327/165
(Continued)

FOREIGN PATENT DOCUMENTS

CN    1972180 A    5/2007
JP    60-100836 U  7/1985
(Continued)

OTHER PUBLICATIONS

International Search Report of PCT application No. PCT/JP2014/004809 dated Oct. 14, 2014.
(Continued)

*Primary Examiner* — Sam K Ahn
*Assistant Examiner* — Sarah Hassan
(74) *Attorney, Agent, or Firm* — Hamre, Schumann, Mueller & Larson, P.C.

(57) ABSTRACT

A communication apparatus (100) of the present invention includes a first communication circuit (2), a second communication circuit (1), and one signal line (3). The first communication circuit (2) transmits a collector voltage of an open collector circuit as an output signal. A second communication circuit (1) receives the output signal. The one signal line (3) connects the first communication circuit (2) and the second communication circuit (1). Particularly the first communication circuit (2) transmits the output signal as a pulse signal (57) to the second communication circuit (1). The second communication circuit (1) transmits a voltage (Continued)

signal (56) generated in the second communication circuit (1) to the first communication circuit (2). The first communication circuit (2) and the second communication circuit (1) communicate the pulse signal (57) and the voltage signal (56) bidirectionally via the signal line (3).

8 Claims, 7 Drawing Sheets

(51) Int. Cl.
    *H04B 3/54*     (2006.01)
    *H04L 25/49*     (2006.01)
    *H04L 7/00*     (2006.01)
    *H04L 5/14*     (2006.01)

(58) Field of Classification Search
    CPC ......... H04L 45/22; H04L 47/12; H04L 12/40; H04L 67/18; H04L 7/0016; H04L 7/0037; H04L 7/06
    USPC .......................................... 375/238; 324/611
    See application file for complete search history.

(56) References Cited

U.S. PATENT DOCUMENTS

| | | | | |
|---|---|---|---|---|
| 5,974,570 | A * | 10/1999 | Kawaguchi | G06F 11/167 714/42 |
| 6,218,810 | B1 * | 4/2001 | Matsumoto | H02J 7/0063 320/134 |
| 6,674,334 | B1 * | 1/2004 | Takada | H03B 5/1203 331/107 A |
| 2002/0198604 | A1 * | 12/2002 | Schulman | A61B 5/0031 623/25 |
| 2003/0007851 | A1 * | 1/2003 | Heigl | A61G 3/061 414/454 |
| 2003/0193339 | A1 * | 10/2003 | Philippart | H03F 3/183 324/611 |
| 2006/0106966 | A1 * | 5/2006 | Joos | G06F 13/385 710/305 |
| 2007/0116135 | A1 | 5/2007 | Tsuchida | |
| 2010/0232485 | A1 * | 9/2010 | Sheiman | H04B 3/03 375/220 |
| 2014/0036988 | A1 * | 2/2014 | Kashima | H04L 25/4902 375/238 |

FOREIGN PATENT DOCUMENTS

| | | |
|---|---|---|
| JP | 8-265308 | 10/1996 |
| JP | 2005-245178 | 9/2005 |
| JP | 4779572 B | 9/2011 |

OTHER PUBLICATIONS

The Extended European Search Report dated Aug. 9, 2016 for the related European Patent Application No. 14847970.2, 14 pages.

English Translation of Chinese Search Report dated Jul. 4, 2018 for the related Chinese Patent Application No. 201480053817.3, 3 pages.

* cited by examiner

COMMUNICATION APPARATUS AND MOTOR CONTROL APPARATUS

TECHNICAL FIELD

The present invention relates to a communication apparatus that performs bidirectional communication between pieces of equipment, and particularly relates to a communication apparatus that performs the bidirectional communication, using one signal line. Additionally the present invention relates to a motor control apparatus, using this communication apparatus.

BACKGROUND ART

Conventionally two signal lines have been required for communicating two types of data bidirectionally between pieces of equipment. One of the communication lines is a signal line for transmission. The other communication line is a signal line for reception.

Moreover, in Patent Literature 1, there has been proposed a technique of performing transmission of two types of data by one signal, using an open collector circuit between pieces of equipment. In Patent Literature 1, a direction where the data is communicated is unidirectional. In Patent Literature 1, a thermistor is attached to a collector that the open collector circuit has. In a communication circuit disclosed in Patent Literature 1, a voltage at off time is detected in a reception-side circuit to thereby perform the transmission of the two types of data. The two types of data are encoder position information and temperature information.

CITATION LIST

Patent Literature

PTL 1: Japanese Patent No. 4779572

SUMMARY OF THE INVENTION

A communication apparatus covered by the present invention includes a first communication circuit, a second communication circuit, and one signal line.

The first communication circuit transmits a collector voltage of an open collector circuit as an output signal. A second communication circuit receives the output signal. The one signal line connects the first communication circuit and the second communication circuit.

Particularly, the first communication circuit transmits the output signal as a pulse signal to the second communication circuit. The second communication circuit transmits a voltage signal generated in the second communication circuit to the first communication circuit. The first communication circuit and the second communication circuit communicate the pulse signal and the voltage signal bidirectionally through the signal line.

Moreover, a motor control apparatus covered by the present invention performs bidirectional communication between a host control apparatus and a subordinate control apparatus, using the above-described communication apparatus.

DESCRIPTION OF EMBODIMENTS

A communication apparatus in exemplary embodiments of the present invention performs bidirectional communication through one (single) signal line with a simple configuration using an open collector circuit. Thus, signal lines can be reduced in the number in performing the bidirectional communication. As a result, the communication apparatus is reduced in weight and in cost.

Moreover, a communication circuit used in the communication apparatus the exemplary embodiments of the present invention is realized with a simple configuration.

Furthermore, in a motor control apparatus that the communication apparatus uses in each of the exemplary embodiments of the present invention, signal lines can be reduced in number in performing the bidirectional communication as in the above-described communication apparatus. As a result, the motor control apparatus is reduced in weight and in cost.

Specifically, a conventional communication apparatus has the following points to be improved. That is, when the bidirectional communication is performed, one signal line is required for transmission and another signal line is required for reception.

Moreover, there is also a communication method which two types of signals are transmitted, using one signal line. However, in this communication method, the signals are transmitted only unidirectionally.

Consequently, the communication apparatus in each of the exemplary embodiments of the present invention performs the bidirectional communication, using a single communication line with a configuration described later.

Hereinafter, the exemplary embodiments of the present invention will be described with reference to the drawings. The following exemplary embodiments are examples in which the present invention is embodied, and do not limit a technical range of the present invention. In the following description, an expression of connecting components includes electrically connecting the components.

First Exemplary Embodiment

Figure 1:
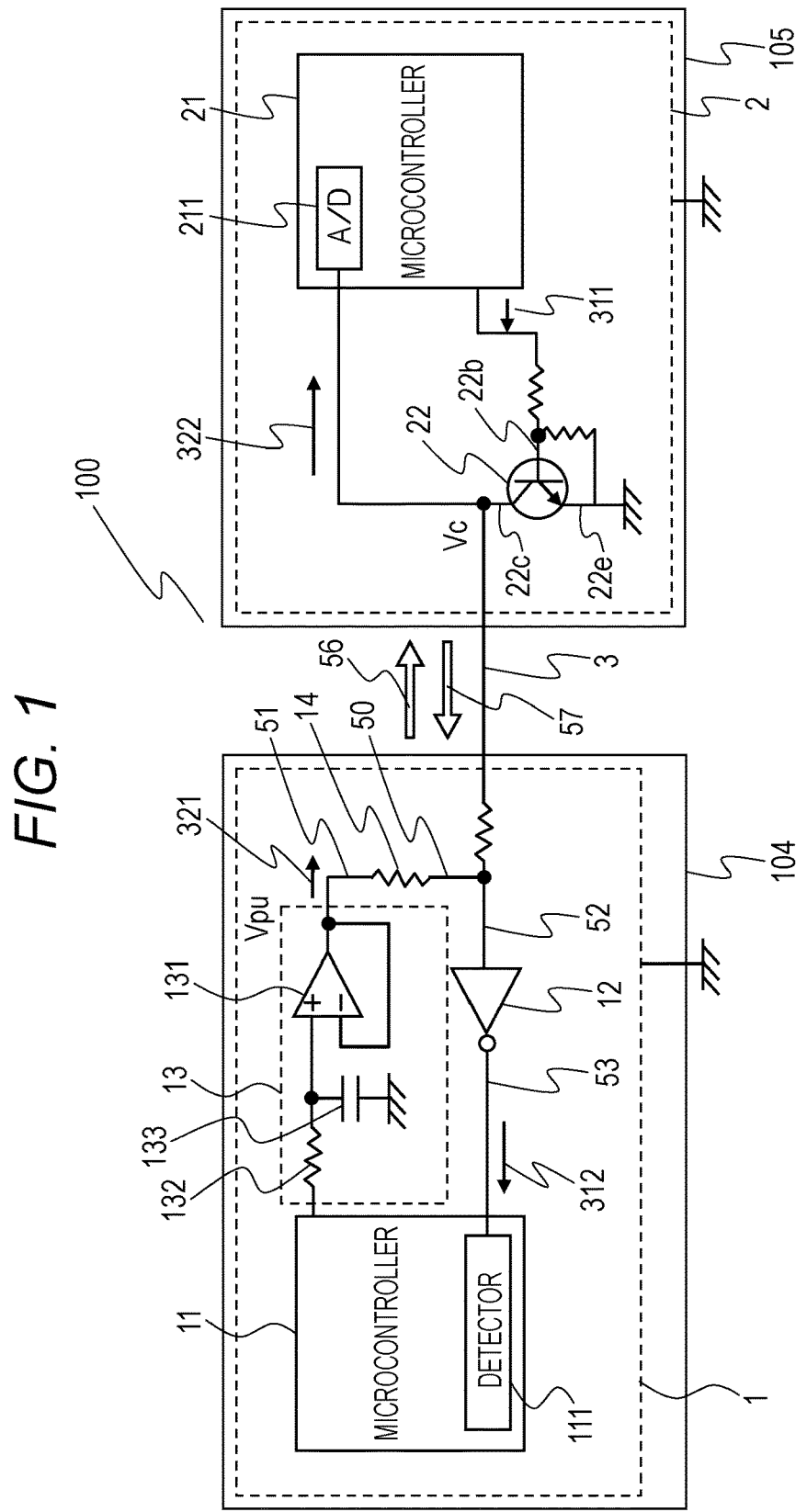
FIG. 1 is a conceptual diagram of a communication apparatus in a first exemplary embodiment of the present invention.
Figure 2:
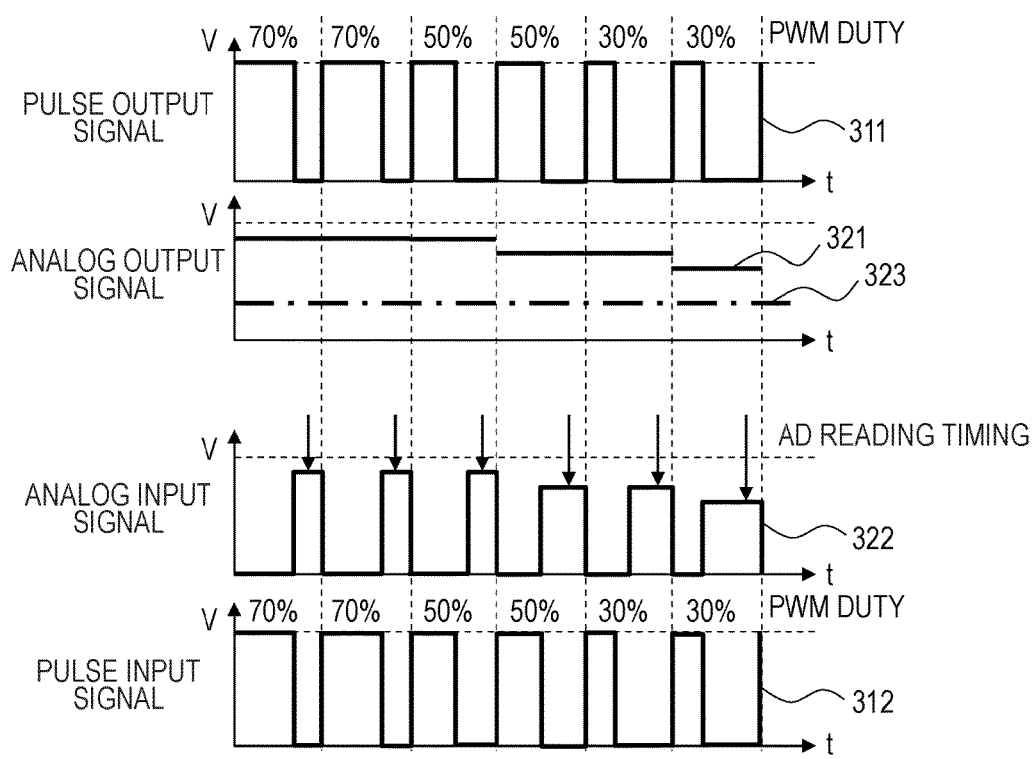
FIG. 2 is a waveform diagram showing signal waveforms of respective parts of the communication apparatus in the first exemplary embodiment of the present invention.
Figure 3:
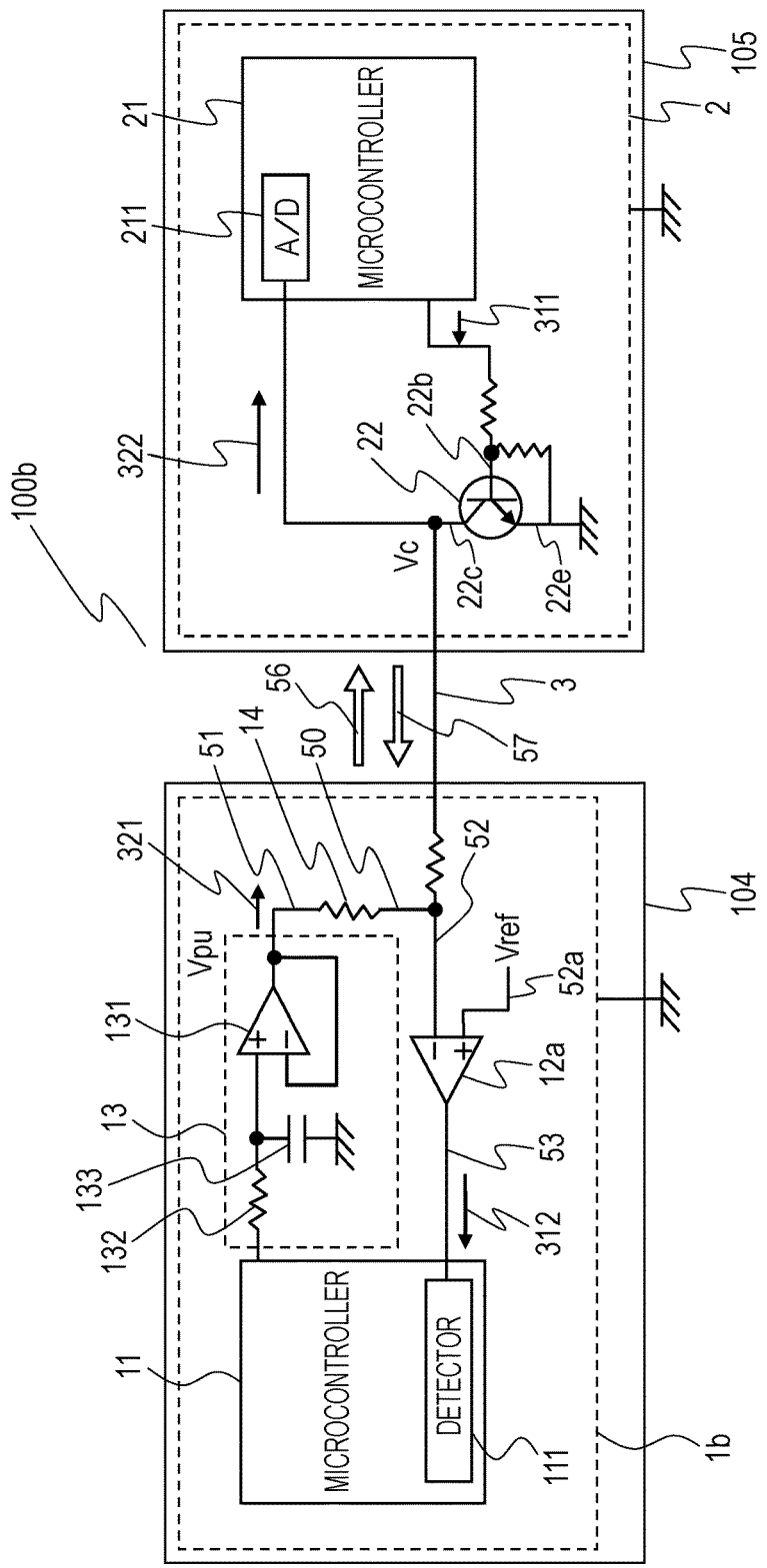
FIG. 3 is a conceptual diagram of another communication apparatus in the first exemplary embodiment of the present invention.
Figure 4:
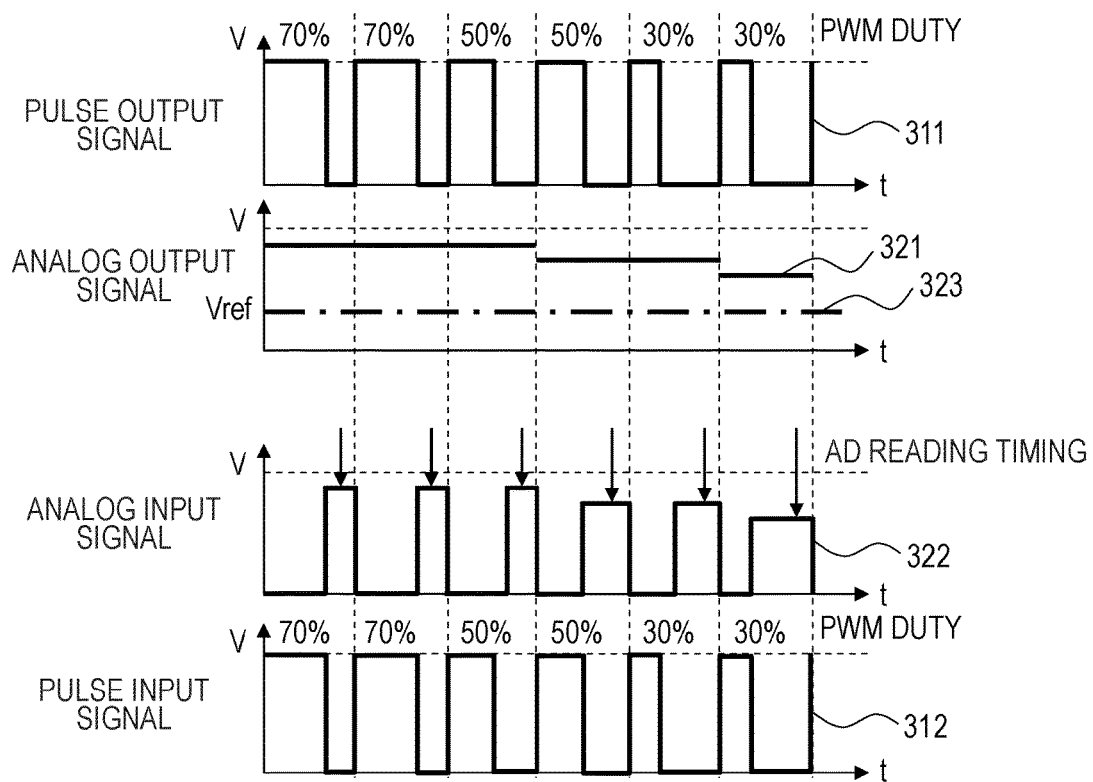
FIG. 4 is a waveform diagram showing signal waveforms of respective parts of another communication apparatus in the first exemplary embodiment of the present invention.

FIG. 1 is a conceptual diagram of a communication apparatus in a first exemplary embodiment of the present invention. FIG. 2 is a waveform diagram showing signal waveforms of respective parts of the communication apparatus in the first exemplary embodiment of the present invention. FIG. 3 is a conceptual diagram of another communication apparatus in the first exemplary embodiment of the present invention. FIG. 4 is a waveform diagram showing signal waveforms of respective parts of the other communication apparatus in the first exemplary embodiment of the present invention.

As shown in FIG. 1, communication apparatus 100 in the first exemplary embodiment of the present invention includes first communication circuit 2, second communication circuit 1 and a single signal line 3.

First communication circuit 2 transmits collector voltage Vc of an open collector circuit as an output signal. Second communication circuit 1 receives collector voltage Vc as the output signal. One signal line 3 connects first communication circuit 2 and second communication circuit 1.

Particularly first communication circuit 2 transmits the output signal as pulse signal 57 to second communication circuit 1. Second communication circuit 1 transmits voltage signal 56 generated in second communication circuit 1 to first communication circuit 2. First communication circuit 2 and second communication circuit 1 communicate pulse signal 57 and voltage signal 56 bidirectionally through signal line 3.

Now, first communication circuit 2 in the first exemplary embodiment of the present invention will be described.

First communication circuit 2 has first transistor 22, microcontroller 21 as a first controller, and AD convertor 211 as a first detector.

First transistor 22 forms the open collector circuit.

Microcontroller 21 as the first controller is connected to base terminal 22b included by first transistor 22. Microcontroller 21 as the first controller outputs pulse output signal 311 as a gate signal, that turns on/off first transistor 22, to base terminal 22b.

AD convertor 211 as the first detector is connected to collector terminal 22c included by first transistor 22. AD convertor 211 as the first detector detects collector voltage Vc generated in collector terminal 22c.

Particularly, microcontroller 21 as the first controller outputs pulse output signal 311, which is the gate signal that turns off first transistor 22, to base terminal 22b. At this time, AD convertor 211 as the first detector detects collector voltage Vc.

Next, second communication circuit 1 in the first exemplary embodiment of the present invention will be described.

Second communication circuit 1 has pull-up resistor 14, H/L level detector 12 as a comparator, second detector 111, microcontroller 11 as a second controller, and a DA convertor 13 as a voltage convertor. Second detector 111 can be realized, for example, by an input terminal that microcontroller 11 includes. The input terminal can be realized by a serial input part capable of communicating data of 1 bit.

In pull-up resistor 14, one terminal 50 thereof is connected to collector terminal 22c included by first transistor 22 forming the open collector circuit.

H/L level detector 12 as the comparator includes input terminal 52 and output terminal 53. Input terminal 52 is connected to collector terminal 22c and one terminal 50. H/L level detector 12 as the comparator compares a preset threshold voltage with a voltage of the output signal transferred through input terminal 52. H/L level detector 12 as the comparator outputs the output signal transmitted from first communication circuit 2 as a result of the comparison between the threshold voltage and the voltage of the output signal. Output terminal 53 outputs pulse input signal 312 as the output signal. Pulse input signal 312 is a pulsed signal including an signal and an L signal.

Second detector 111 is connected to output terminal 53. Second detector 111 receives pulse input signal 312 output from H/L level detector 12 as the comparator.

Microcontroller 11 as the second controller outputs a predetermined value, in the first exemplary embodiment of the present invention, the predetermined value is formed of serial data obtained by sequentially transmitting data in a unit of one bit. As a specific example, the predetermined value is formed of a digital signal such as a PWM (Pulse Width Modulation) signal and the like.

DA convertor 13 as the voltage convertor converts the predetermined value to pull-up voltage Vpu not lower than a threshold voltage. DA convertor 13 as the voltage convertor transfers converted pull-up voltage Vpu to another terminal 51 included in pull-up resistor 14.

Signal line 3 connects collector terminal 22c and one terminal 50 included in pull-up resistor 14. First communication circuit 2 and second communication circuit 1 communicate pulse signal 57 and voltage signal 56 bidirectionally through signal line 3.

Further, the explanation is described in detail.

As shown in FIG. 1, in communication apparatus 100 in the present first exemplary embodiment, first equipment 105 and second equipment 104 are connected by signal line 3. Second equipment 104 is equipped with second communication circuit 1. First equipment 105 is equipped with first communication circuit 2.

First equipment 105 transmits pulse signal 57 to second equipment 104. Second equipment 104 transmits voltage signal 56 to first equipment 105. In other words, second equipment 104 receives pulse signal 57 transmitted from first equipment 105. First equipment 105 receives voltage signal 56 transmitted from second equipment 104.

First equipment 105 and second equipment 104 are connected by one signal line 3. Single signal line 3 transmits pulse signal 57 and voltage signal 56 in the respective directions where they are to be transmitted.

Hereinafter, operation of transmitting/receiving the output signal between first communication circuit 2 and second communication circuit 1 mounted on the respective pieces of equipment will be described.

In second communication circuit 1, microcontroller 11 outputs the predetermined value. As the predetermined value, there is data indicating an actual rotation state of a motor or the like as in one example described later. Specifically, the predetermined value is an actual rotation number of the motor actually rotating, or the like. The predetermined value need not be limited to the value indicating the actual rotation state of the motor. The predetermined value is only required to be a value that is converted from a state change to analog output signal 321 and is able to be transmitted, as described later. DA convertor 13 converts the predetermined value to analog output signal 321. DA convertor 13 includes buffer 131. DA convertor 13 is connected through pull-up resistor 14 to signal line 3 and input terminal 52 that H/L level detector 12 has. Pull-up resistor 14 is connected through signal line 3 to collector terminal 22c, which is a receiving portion of first transistor 22 forming the open collector circuit.

Analog output signal 321 forms pull-up voltage Vpu of H/L level detector 12. Analog output signal 321 varies at a voltage level not lower than the threshold value of H/L level detector 12.

H/L level detector 12 outputs pulse input signal 312. Pulse input signal 312 output from H/L level detector 12 is input to second detector 111 that microcontroller 11 has.

In first communication circuit 2, microcontroller 21 outputs a predetermined value. The predetermined value is data that instructs a driving condition to the motor as in the one example described later. Specifically, the predetermined value is a target rotation number of the motor. The predetermined value need not be limited to a driving command of the motor. The predetermined value is only required to be a value that sis converted from a transfer signal to second equipment 104 to pulse output signal 311 and is able to be transmitted, as described later. The output predetermined value forms pulse output signal 311. Pulse output signal 311 is transferred to base terminal 22b of the open collector circuit formed of first transistor 22. Pulse output signal 311 is output to an outside of first communication circuit 2 through the open collector circuit.

Moreover, in first communication circuit 2, AD convertor 211 detects collector voltage Vc generated in collector terminal 22c that first transistor 22 has.

When communication apparatus 100 shown in FIG. 1 is operated, the waveforms occurring in the respective parts are shown in FIG. 2. In one specific example described below, microcontroller 21 that first communication circuit 2 has outputs the PWM signal as pulse output signal 311.

Pulse output signal 311 is transferred to second communication circuit 1 through first transistor 22 forming the open collector circuit. First transistor 22 transfers the signal, using pull-up voltage Vpu generated via the following process. That is, microcontroller 11 that second communication circuit 1 has generates the predetermined value. The predetermined value generated in microcontroller 11 is converted to analog output signal 321 in DA convertor 13. Analog output signal 321 is also used as pull-up voltage Vpu. Moreover, analog output signal 321 is transmitted to first communication circuit 2 via signal line 3 to form analog input signal 322. Analog input signal 322 is detected in AD convertor 211. As shown in FIG. 2, in first communication circuit 2, when first transistor 22 is turned off a high level voltage of analog input signal 322 becomes equal to a voltage of analog output signal 321. That is, at timing when pulse output signal 311 output from microcontroller 21 is turned off, an AD value of analog input signal 322 is read. That is, at the timing when pulse output signal 311 is turned off, the voltage of analog input signal 322 read by AD convertor 211 is detected. This allows first communication circuit 2 to receive analog output signal 321 output from second communication circuit 1. On the other hand, second communication circuit 1 receives pulse output signal 311 output from first communication circuit 2. In second communication circuit 1, second detector 111 detects received pulse output signal 311 through H/L level detector 12. Second detector 111 receives, as pulse input signal 312, pulse output signal 311 inverted in H/L level detector 12.

As described above, communication apparatus 100 in the first exemplary embodiment realizes the bidirectional communication by transmitting/receiving pulse signal 57 and voltage signal 56, using single signal line 3.

Now, the voltage convertor that second communication circuit 1 has will be described in detail.

In FIG. 1, the voltage convertor is shown as DA convertor 13. DA convertor 13 has an RC circuit formed of resistor 132 and capacitor 133. In the present configuration, microcontroller 11 outputs the predetermined value as the PWM signal. The predetermined value output from microcontroller 11 is converted to the analog signal that smoothly changes in the RC circuit. The analog signal smoothly changes in a voltage range where microcontroller 11 can output.

In a current that can be output from microcontroller 11 has a limit thereof. Consequently buffer 131 is located on a downstream side of the RC circuit. DA convertor 13 increases the outputable current by buffer 131 intervening.

DA convertor 13 may be configured inside microcontroller 11.

Microcontroller 11 outputs the PWM signal to the voltage convertor formed of DA convertor 13 so that the voltage is not below the threshold voltage set in H/L level detector 12. In FIG. 2, threshold 323 is indicated by dashed line.

Next, another specific example of the comparator will described with reference to FIG. 3.

Communication apparatus 100b shown in FIG. 3 includes second communication circuit 1b. Second communication circuit 1b has H/L level detector 12a as the comparator. More specifically, in FIG. 3, H/L level detector 12a indicated by the comparator is used in place of H/L level detector 12 indicated by the inverting element in FIG. 1. Voltage Vref is connected to input terminal 52a included by H/L level detector 12a. Thus, as shown in FIG. 4, threshold 323 is voltage Vref connected to input terminal 52a when level detector 12a is used.

As is evident from the above description, H/L level detector 12, 12a as the comparator can be realized by the inverting element or the comparator.

Second Exemplary Embodiment

Figure 5:
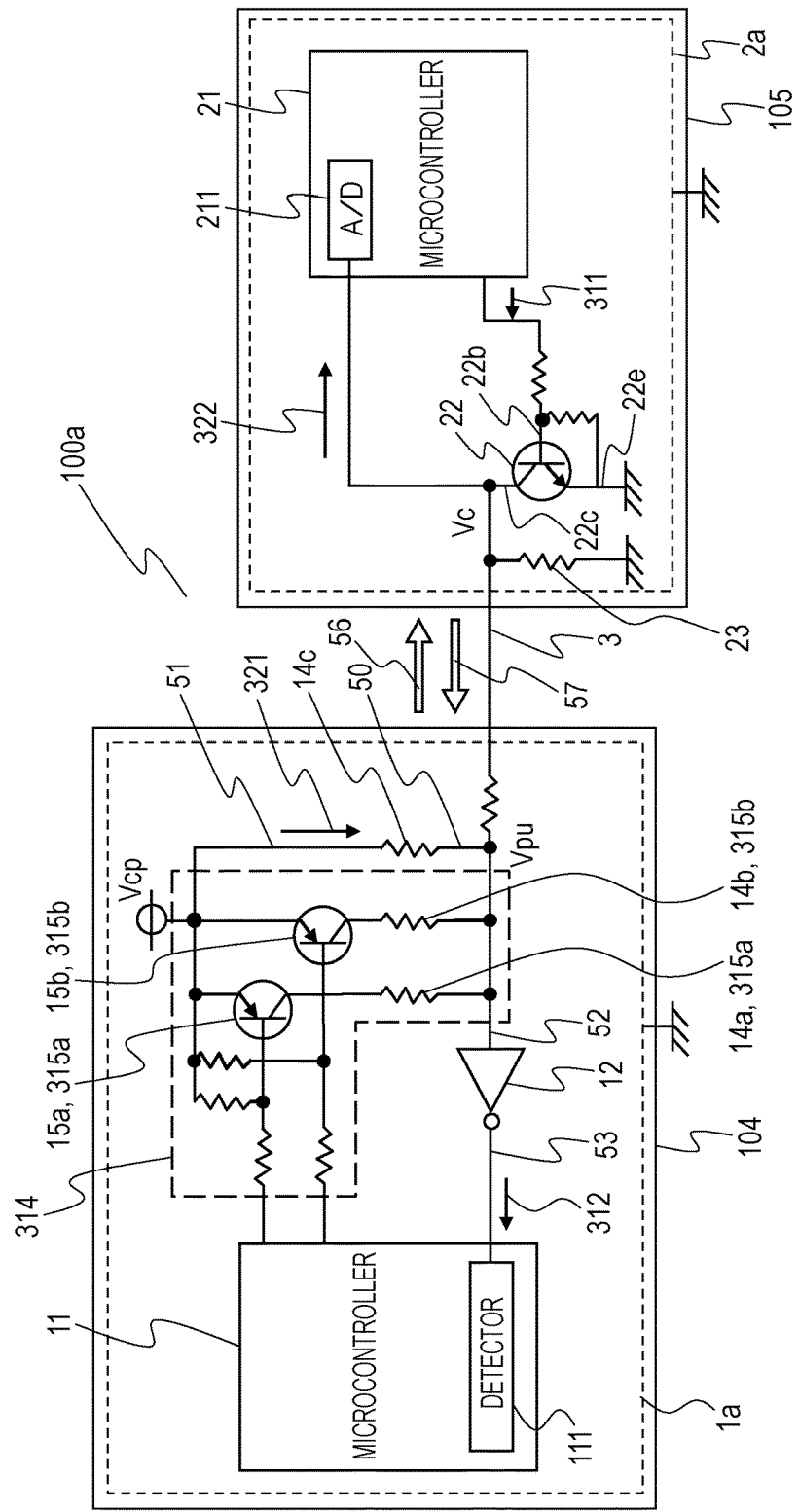
FIG. 5 is a conceptual diagram of a communication apparatus in a second exemplary embodiment of the present invention.
Figure 6:
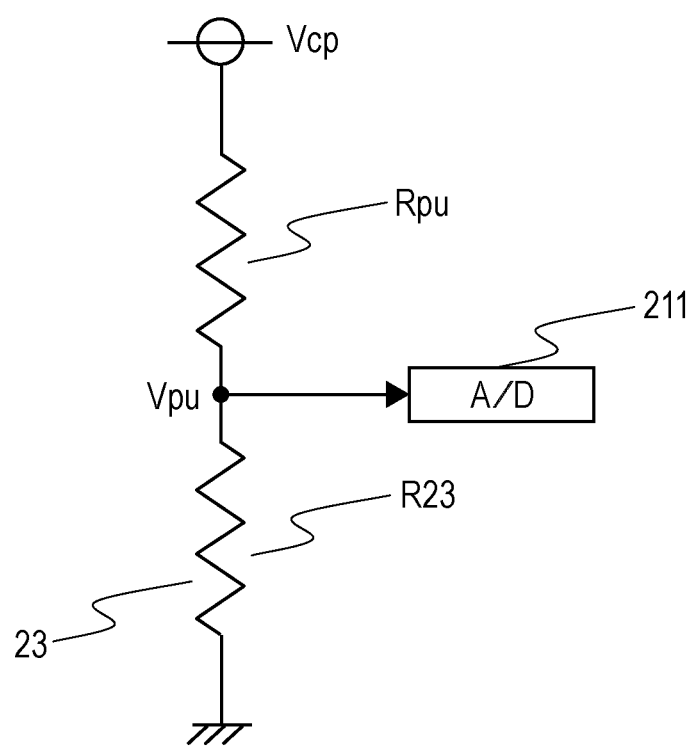
FIG. 6 is a conceptual diagram of a combined resistance used in the communication apparatus in the second exemplary embodiment of the present invention.

FIG. 5 is a conceptual diagram of a communication apparatus in a second exemplary embodiment of the present invention. FIG. 6 is a conceptual diagram of a combined resistance used in the communication apparatus in the second exemplary embodiment of the present invention.

In communication apparatus 100a described in the second exemplary embodiment, a first communication circuit and a second communication circuit are different in the following points, as compared with communication apparatus 100 described in the first exemplary embodiment.

That is, in first communication circuit 2a described in the second exemplary embodiment, first transistor 22 further has voltage dividing resistor 23 between emitter terminal 22e and collector terminal 22c included by first transistor 22.

Moreover, second communication circuit 1a described in the second exemplary embodiment has variable voltage convertor 314 connected to first resistor 14c as a pull-up resistor in parallel. Variable voltage convertor 314 has resistor strings 315a, 315b to vary a resistance value in accordance with a predetermined value output by microcontroller 11 as a second controller. In the present second exemplary embodiment, the predetermined value is a value for obtaining a desired pull-up voltage Vpu. Specifically, the predetermined value is a gate signal that turns on/off second transistors 15a, 15b. When a plurality of transistors are used as the second transistor as in the present second exemplary embodiment, the exemplary embodiment can be implemented, using parallel data. On the other hand, when one transistor is used as the second transistor, the exemplary embodiment can be implemented, using serial data, respective one bit of which forms the data. Variable voltage convertor 314 converts the predetermined value to pull-up voltage Vpu not lower than a threshold voltage. Variable voltage convertor 314 transfers converted pull-up voltage Vpu to one terminal 50 included by first resistor 14c as the pull-up resistor.

Particularly resistor strings 315a, 315b are configured by connecting second transistors 15a 15b and second resistors 14a, 14b in series.

Variable voltage convertor 314 has resistor strings 315a, 315b which string is at least one string or more, connected in parallel. Variable voltage convertor 314 turns on/off respective second transistor 15a, 15b in accordance with the predetermined value output by microcontroller 11 as the second controller. Variable voltage convertor 314 changes a combined resistance value of variable voltage convertor 314 by turning on/off the respective second transistors 15a, 15b.

Hereinafter, a description will be given with reference to FIGS. 5, 6.

For the same components as those described in the above-described first exemplary embodiment, the same reference numerals are used and the same explanations are applied.

As shown in FIG. 5, second communication circuit 1a includes microcontroller 11. Second communication circuit 1a and second communication circuit 1 described in the first exemplary embodiment are different in the following points.

That is, second communication circuit 1a has variable voltage convertor 314 between input terminal 52 that H/L level detector 12 has, and pull-up power supply Vcp. In variable voltage convertor 314, resistor string 315a and resistor string 315b are connected in parallel to first resistor 14c as the pull-up resistor. In resistor string 315a, second resistor 14a and second transistor 15a are connected in series. In resistor string 315b, second resistor 14b and second transistor 15b are connected in series.

As shown in FIGS. 5, 6, in the present configuration, a combined pull-up resistance Rpu and a pull-up voltage Vpu are calculated in the following procedure.

1. Combined pull-up resistance Rpu:

Combined pull-up resistance Rpu is calculated by combining variable voltage convertor 314 and first resistor 14c as the pull-up resistor.

In variable voltage convertor 314, second transistors 15a, 15b are switched on/off in accordance with the predetermined value output from microcontroller 11. When second transistors 15a, 15b are turned on/off, a resistance component generated in variable voltage convertor 314 is switched. In variable voltage convertor 314, combined resistance R314 is calculated from the switched resistance component.

Combined resistance R314 that variable voltage convertor 314 has, and first resistor 14c as the pull-up resistor are connected in parallel. Combining the calculated combined resistance R314 and first resistor 14c results in calculating combined pull-up resistance Rpu.

2. Pull-up voltage Vpu:

Pull-up voltage Vpu is calculated in a voltage dividing ratio between combined pull-up resistance Rpu and voltage dividing resistor 23.

First communication circuit 2a has voltage dividing resistor 23 connected between collector terminal 22c that first transistor 22 has, and a reference electrical potential ground (GND) in first transistor 22 forming the open collector circuit.

That is, as shown in FIG. 6, in the present second exemplary embodiment, the combined pull-up resistance Rpu and resistance R23 of voltage dividing resistor 23 exist between pull-up power supply Vcp and the reference electrical potential GND. Thus, pull-up voltage Vpu is calculated in the voltage dividing ratio between combined pull-up resistance Rpu and resistance R23 of voltage dividing resistor 23 with respect to pull-up power supply Vcp. That is, pull-up voltage Vpu detected in AD convertor 211 is derived from the following expression (1).

$$Vpu = Vcp \cdot R23/(Rpu + R23) \quad (1)$$

As described above, combined pull-up resistance Rpu is adjusted, using the predetermined value output from microcontroller 11.

Pull-up voltage Vpu calculated in this manner is detected in AD convertor 211 as collector voltage Vc.

Now, specific examples of combined pull-up resistance Rpu and pull-up voltage Vpu will be described.

(1) First specific example:

For example, when second transistors 15a, 15b are on, a value obtained by combining first resistor 14c and second resistors 14a, 14b is pull-up resistance Rpu.

Pull-up voltage Vpu is calculated from the voltage dividing ratio between this pull-up resistance Rpu and resistance R23 of voltage dividing resistor 23.

That is, pull-up voltage Vpu is derived from first resistor 14c, second resistors 14a, 14b, and voltage dividing resistor 23.

(2) Second specific example:

For example, when second transistors 15a, 15b are off, combined resistance R314 of variable voltage convertor 314 does not exist. Thus, combined pull-up resistance Rpu is the resistance of first resistor 14c.

Thus, pull-up voltage Vpu is calculated from a voltage dividing ratio between first resistor 14c and voltage dividing resistor 23.

Next, first communication circuit 2a includes microcontroller 21. A predetermined value output from microcontroller 21 is transferred as pulse output signal 311 to base terminal 22b that first transistor 22 has.

The open collector circuit is formed of first transistor 22, and voltage dividing resistor 23 connected between collector terminal 22c that first transistor 22 has, and reference electrical potential GND. Pulse output signal 311 transferred to first transistor 22 is transmitted to second communication circuit 1a through the open collector circuit.

Moreover, collector voltage Vc generated in collector terminal 22c that first transistor 22 has is detected by AD convertor 211.

In the present second exemplary embodiment, the analog voltage detected in AD convertor 211 is generated according to voltage dividing ratio of pull-up resistance Rpu and the like combined, using the variable voltage convertor 314, and voltage dividing resistor 23. According to the present configuration, communication apparatus 100a can perform the bidirectional communication in which voltage signal 56 and pulse signal 57 are transmitted/received between second communication circuit 1a and first communication circuit 2a, using single signal line 3, as in the first exemplary embodiment.

In the example shown in FIG. 5, the configuration is employed in which the two second resistors and the two second transistors, which configure the pull-up resistor, are used. The numbers of the second resistors and the second transistors, which form the variable voltage convertor, may be each one or three or more respectively.

Moreover, DA convertor 13, which is the voltage convertor described in the first exemplary embodiment, and variable voltage convertor 314 described in the second exemplary embodiment have the following advantages respectively.

That is, in the case where DA convertor 13 is used, pull-up voltage Vpu that can be taken smoothly changes.

On the other hand, in the case where variable voltage convertor 314 is used, resolution of pull-up voltage Vpu that can be taken is inferior to that in the case where DA convertor 13 is used. However, variable voltage convertor 314 can be realized with an inexpensive circuit configuration, which can suppress the cost.

Third Exemplary Embodiment

Figure 7:
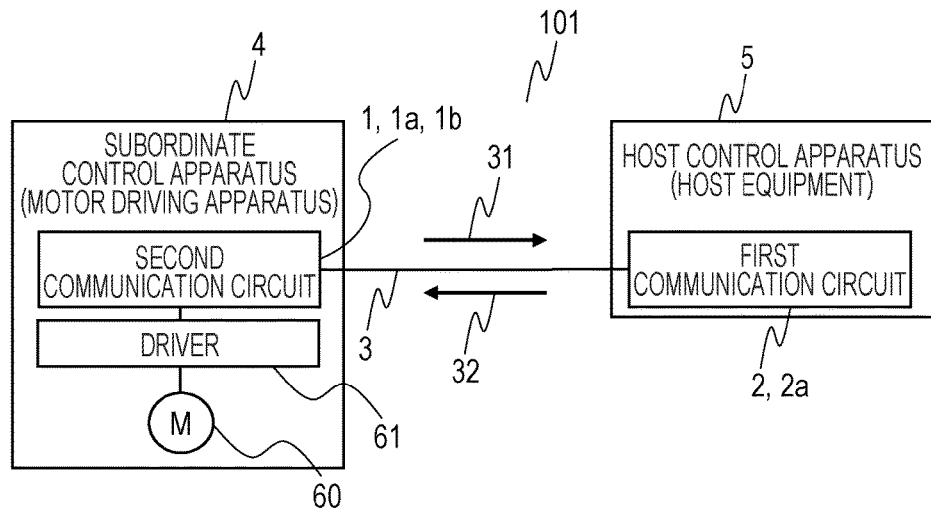
FIG. 7 is a block diagram showing an outline of a motor control apparatus in a third exemplary embodiment of the present invention.
Figure 8:
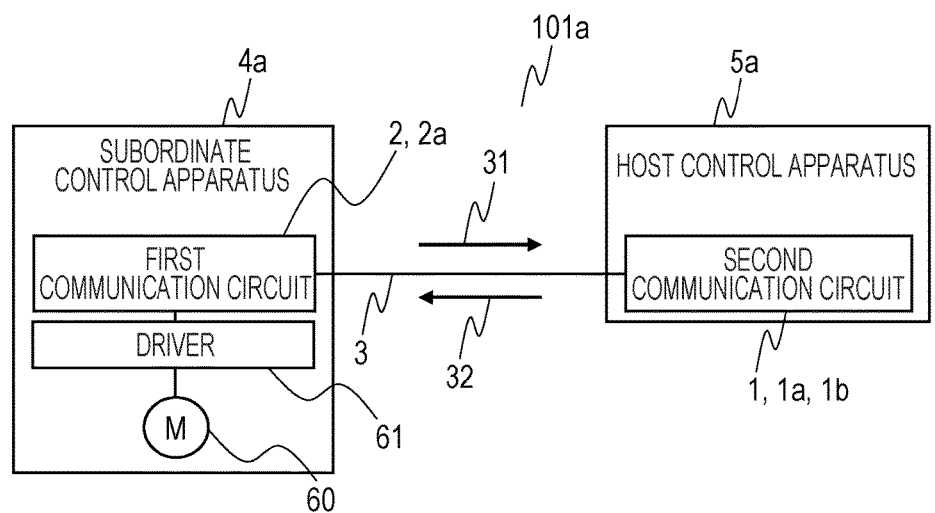
FIG. 8 is a block diagram showing another outline of the motor control apparatus in the third exemplary embodiment of the present invention.

FIG. 7 is a block diagram showing an outline of a motor control apparatus in a third exemplary embodiment of the present invention. FIG. 8 is a block diagram showing another outline of the motor control apparatus in the third exemplary embodiment of the present invention.

As shown in FIG. 7, in motor control apparatus 101 described in the third exemplary embodiment, as to first communication circuit 2 used in host control apparatus 5 and second communication circuit 1 used in subordinate control apparatus 4, the contents described in the first exemplary embodiment and the second exemplary embodiment are applied.

A communication circuit used in host control apparatus 5 may be first communication circuit 2a in place of first communication circuit 2. A communication circuit used in subordinate control apparatus 4 may be second communication circuits 1a, 1b in place of second communication circuit 1.

Moreover, for the same components as those described in the first exemplary embodiment or the second exemplary embodiment, the above descriptions are applied with the same reference numerals.

As shown in FIG. 7, motor control apparatus 101 in the third exemplary embodiment of the present invention includes host control apparatus 5 and subordinate control apparatus 4.

Host control apparatus 5 has first communication circuit 2 that transmits a collector voltage of an open collector circuit as an output signal. Subordinate control apparatus 4 has second communication circuit 1 that receives the output signal, motor 60 and driver 61 that drives motor 60.

Host control apparatus 5 outputs motor rotation-number command signal 32 to subordinate control apparatus 4 via signal line 3. Subordinate control apparatus 4 drives motor 60 via driver 61, based on input motor rotation-number command signal 32. Subordinate control apparatus 4 outputs motor actual-rotation information 31 to host control apparatus 5 via signal line 3. Motor actual-rotation information 31 includes motor actual rotation number and alarm information and the like.

Hereinafter, the explanations will be given with reference to FIG. 7.

As shown in FIG. 7, subordinate control apparatus 4 having second communication circuit 1 functions as a motor driving apparatus. Host control apparatus 5 having first communication circuit 2 functions as host equipment that instructs subordinate control apparatus 4.

For example, host control apparatus 5 has an electronic control unit (hereinafter, referred to as an "ECU"). The ECU that host control apparatus 5 has outputs motor rotation-number command signal 32 for driving motor 60. Motor rotation-number command signal 32 is given as a pulse signal such as a PWM signal and the like. Motor rotation-number command signal 32 output from the ECU is transferred via single signal line 3 to second communication circuit 1 that subordinate control apparatus 4 has. Motor rotation-number command signal 32 transferred to second communication circuit 1 drives motor 60 via driver 61.

A state where motor 60 is actually driven is transmitted from second communication circuit 1 to first communication circuit 2 through signal line 3. For example, the state where motor 60 is actually driven is transferred as motor actual-rotation information 31. Motor actual-rotation information 31 includes a rotation number and the like of motor 60. Motor actual-rotation information 31 is expressed as a voltage signal.

In this manner, motor actual-rotation information 31 is fed back to host control apparatus 5. Host control apparatus 5 grasps the actual driving state of motor 60, and then, derives new motor rotation-number command signal 32 so as to drive motor 60 in a more optimal state.

In place of motor control apparatus 101 shown in FIG. 7, the following configuration also allows motor 60 to be controlled similarly.

That is, as shown in FIG. 8, motor control apparatus 101a includes host control apparatus 5a and subordinate control apparatus 4a.

Subordinate control apparatus 4a has first communication circuit 2 that transmits collector voltage Vc of the open collector circuit as an output signal. Further, subordinate control apparatus 4a has motor 60 and driver 61 that drives motor 60.

Host control apparatus 5a has second communication circuit 1 that receives the output signal.

Moreover, obviously the communication circuit in host control apparatus 5a may be second communication circuits 1a, 1b in place of second communication circuit 1. The communication circuit used in subordinate control apparatus 4a may be first communication circuit 2a in place of first communication circuit 2.

In the above description, the transistors have been described, using bipolar transistors.

The present invention provides similar effects by using other semiconductor elements that contribute to amplification or switching operation. For example, as the transistor, a field effect transistor (YET) and the like may be used. In the case FET is used, the "emitter", the "base" and the "collector" used in the above description are replaced by a "source", a "gate" and a "drain", respectively, which can provide similar actions and effects.

INDUSTRIAL APPLICABILITY

A communication apparatus and a motor control apparatus of the present invention can reduce a number of signal lines used in bidirectional communication with a simple configuration. Thus, the use of the communication apparatus and the motor control apparatus of the present invention enables reduction in cost and in weight. For example, the use of the communication apparatus and the motor control apparatus of the present invention in an automobile increases fuel efficiency. That is, the communication apparatus and the motor control apparatus of the present invention are useful for onboard equipment and a motor control apparatus for vehicle, which require reduction in weight. Moreover, the communication apparatus and the motor control apparatus of the present invention are also useful for an electric apparatus and a motor control apparatus for home electric appliance or for industry.

REFERENCE MARKS IN THE DRAWINGS 1, 1a, 1b: second communication circuit
2, 2a: first communication circuit
3: signal line 4, 4a: subordinate control apparatus
5, 5a: host control apparatus
11: microcontroller (second controller)
12, 12a: Hit, level detector (comparator)
13: DA convertor (voltage convertor)
14: pull-up resistor
14a, 14b: second resistor
14c: first resistor
15a, 15b: second transistor
21: microcontroller (first controller)
22: first transistor
22b: base terminal
22c: collector terminal
22e: emitter terminal.
23: voltage dividing resistor
31: motor actual-rotation information
32: motor rotation-number command signal
50: one terminal
51: other terminal
52, 52a: input terminal
53: output terminal
56: voltage signal
57: pulse signal
60: motor
61: driver
100, 100a, 100b: communication apparatus
101, 101a: motor control apparatus
104: second equipment
105: first equipment
111: second detector
131: buffer
132: resistor
133: capacitor
211: AD convertor (first detector)
311: pulse output signal (gate signal)
312: pulse input signal
314: variable voltage convertor
315a, 315b: resistor string
321: analog output signal
322: analog input signal
323: threshold

The invention claimed is:

1. A communication apparatus comprising:
a first communication circuit configured to transmit a collector voltage of an open collector circuit as an output signal;
a second communication circuit configured to receive the output signal; and
a single signal line for connecting the first communication circuit and the second communication circuit,
wherein the first communication circuit transmits the output signal as a pulse signal to the second communication circuit,
the second communication circuit transmits a voltage signal generated in the second communication circuit to the first communication circuit, the voltage signal being an analog signal,
the first communication circuit and the second communication circuit communicate the pulse signal and the voltage signal bidirectionally via the signal line, the voltage signal being an analog signal,
the first communication circuit includes:
a first transistor forming the open collector circuit;
a first controller connected to a base terminal included in the first transistor, and configured to output a gate signal to the base terminal, the gate signal operable to turn on/off the first transistor; and
a first detector connected to a collector terminal included in the first transistor, and configured to detect the collector voltage generated in the collector terminal, and
the first detector detects the collector voltage when the first controller outputs the gate signal turning off the first transistor to the base terminal.

2. The communication apparatus according to claim 1, wherein
the second communication circuit includes:
a pull-up resistor having one terminal, the one terminal connected to the collector terminal included in the first transistor forming the open collector circuit;
a comparator including:
an input terminal connected to the collector terminal and the one terminal; and
an output terminal for outputting the output signal transmitted from the first communication circuit as a pulsed pulse input signal including an H signal and an L signal, wherein a predetermined threshold voltage and the voltage of the output signal transmitted via the input terminal are compared and the output signal transmitted from the first communication circuit is output as a result of a comparison between the predetermined threshold voltage and the voltage of the output signal;
a second detector connected to the output terminal and configured to receive the pulse input signal output from the comparator;
a second controller configured to output a predetermined value; and
a voltage convertor configured to convert the predetermined value to a pull-up voltage not lower than the threshold voltage, and transmits the converted pull-up voltage to an other terminal included in the pull-up resistor.

3. The communication apparatus according to claim 1, wherein
the first communication circuit further includes:
a voltage dividing resistor provided between an emitter terminal and the collector terminal included in the first transistor,
the second communication circuit includes:
a pull-up resistor, one terminal of the pull-up resistor connected to the collector terminal;
a comparator including:
an input terminal connected to the collector terminal and the one terminal; and
an output terminal for outputting the output signal as a pulsed pulse input signal including an H signal and an L signal, wherein a predetermined threshold voltage and the voltage of the output signal transmitted via the input terminal are compared and the output signal transmitted from the first communication circuit is output as a result of a comparison between the predetermined threshold voltage and the voltage of the output signal;
a second detector connected to the output terminal and configured to receive the pulse input signal output by the comparator;
a second controller configured to output a predetermined value; and
a variable voltage convertor connected to the pull-up resistor in parallel, having a resistor string with a resistance value changed in accordance with the predetermined value, and configured to convert the predetermined value to a pull-up voltage not lower than the threshold voltage, and transfer the converted pull-up voltage to the one terminal included in the pull-up resistor, and the signal line connects the collector terminal and the one terminal.

4. The communication apparatus according to claim 3, wherein the resistor string is formed of a second transistor and a second resistor connected in series, and the variable voltage convertor has at least one or more of the resistor string connected in parallel, and a combined resistor value of the variable voltage convertor is changed by turning on/off respective one of the second transistors in accordance with the predetermined value output by the second controller.

5. A motor control apparatus comprising: a host control apparatus comprising a first communication circuit, the first communication circuit including: a first transistor forming an open collector circuit; a first controller connected to a base terminal included in the first transistor, and configured to output a gate signal, that turns on/off the first transistor, to the base terminal; and a first detector connected to a collector terminal included in the first transistor, and configured to detect a collector voltage generated in the collector terminal, the first communication circuit transmits the collector voltage of the open collector circuit as an output signal, and the first detector detects the collector voltage when the first controller outputs the gate signal turning off the first transistor to the base terminal; a subordinate control apparatus comprising: a second communication circuit having: a pull-up resistor, one terminal of the pull-up resistor being connected to the collector terminal; a comparator including: an input terminal connected to the collector terminal and the one terminal; and an output terminal for outputting the output signal as a pulsed pulse input signal including an H signal and an L signal, wherein a predetermined threshold voltage and the voltage of the output signal transmitted via the input terminal are compared and the output signal transmitted from the first communication circuit is output as a result of a comparison between the predetermined threshold voltage and the voltage of the output signal; a second detector connected to the output terminal and configured to receive the pulse input signal output by the comparator; a second controller configured to output a predetermined value; and a voltage convertor configured to convert the predetermined value to a pull-up voltage not lower than the threshold voltage, and transfer the converted pull-up voltage to another terminal included by the pull-up resistor, the second communication circuit operable to receive the output signal; a motor; and a driver configured to drive the motor; and a single signal line for connecting the collector terminal that the first communication circuit has and the one terminal that the second communication circuit has, wherein the host control apparatus operable to convert a motor rotation command to a pulse signal to output the pulse signal to the subordinate control apparatus via the signal line, and the subordinate control apparatus operable to drive the motor via the driver based on the input motor rotation command, and convert motor actual-rotation information to a voltage signal to output the voltage signal to the host control apparatus via the signal line.

6. A motor control apparatus comprising: a subordinate control apparatus including: a first communication circuit having: a first transistor forming an open collector circuit; a first controller connected to a base terminal included in the first transistor and configured to output a gate signal, that turns on/off the first transistor, to the base terminal; and a first detector connected to a collector terminal included in the first transistor and configured to detect a collector voltage generated in the collector terminal, the first communication circuit transmits the collector voltage of the open collector circuit as an output signal, and the first detector detects the collector voltage when the first controller outputs the gate signal turning off the first transistor to the base terminal; a motor; and a driver configured to drive the motor; a host control apparatus including a second communication circuit having: a pull-up resistor, one terminal of the pull-up resistor connected to the collector terminal; a comparator including: an input terminal connected to the collector terminal and the one terminal; and an output terminal for outputting the output signal as a pulsed pulse input signal including an H signal and an L signal, wherein a predetermined threshold voltage and the voltage of the output signal transmitted via the input terminal are compared and the output signal transmitted from the first communication circuit is output as a result of a comparison between the predetermined threshold voltage and the voltage of the output signal; a second detector connected to the output terminal and configured to receive the pulse input signal output by the comparator; a second controller configured to output a predetermined value; and a voltage convertor configured to convert the predetermined value to a pull-up voltage not lower than the threshold voltage, and transmit the converted pull-up voltage to another terminal included in the pull-up resistor, the second communication circuit operable to receive the output signal; and a single signal line for connecting the collector terminal that the first communication circuit has and the one terminal that the second communication circuit has, wherein the host control apparatus converts a motor rotation command to a voltage signal to output the voltage signal to the subordinate control apparatus via the signal line, and the subordinate control apparatus drives the motor through the driver, based on the input motor rotation command, and converts motor actual-rotation information to a pulse signal to output the pulse signal to the host control apparatus via the signal line.

7. A motor control apparatus comprising: a host control apparatus comprising a first communication circuit having: a first transistor forming an open collector circuit; a first controller connected to a base terminal included in the first transistor and configured to output a gate signal, that turns on/off the first transistor, to the base terminal; a first detector connected to a collector terminal included in the first transistor and configured to detect a collector voltage generated in the collector terminal; and a voltage dividing resistor provided between an emitter terminal included in the first transistor and the collector terminal, the first communication circuit transmits the collector voltage of the open collector circuit as an output signal, and the first detector detects the collector voltage when the first controller outputs the gate signal turning off the first transistor to the base terminal; a subordinate control apparatus including: a second communication circuit having: a pull-up resistor, one terminal of the pull-up resistor connected to the collector terminal; a comparator including: an input terminal connected to the collector terminal and the one terminal; and an output terminal for outputting the output signal as a pulsed pulse input signal including an H signal and an L signal, wherein a predetermined threshold voltage and the voltage of the output signal transmitted via the input terminal are compared and the output signal transmitted from the first communication circuit is output as a result of a comparison between the predetermined threshold voltage and the voltage of the output signal; a second detector connected to the output terminal and configured to receive the pulse input signal output by the comparator; a second controller configured to output a predetermined value; and a variable voltage convertor connected to the pull-up resistor in parallel, having a resistor string with a resistance value changed in accordance with the predetermined value, and configured to convert the predetermined value to a pull-up voltage not lower than the threshold voltage, and transfer the converted pull-up voltage to the one terminal included in the pull-up resistor, the second communication circuit operable to receive the output signal; a motor; and a driver configured to drive the motor; and a single signal line for connecting the collector terminal that the first communication circuit has, and the one terminal that the second communication circuit has, wherein the host control apparatus converts a motor rotation command to a pulse signal to output the pulse signal to the subordinate control apparatus via the signal line, and the subordinate control apparatus drives the motor via the driver, based on the input motor rotation command, and converts motor actual-rotation information to a voltage signal to output the voltage signal to the host control apparatus via the signal line.

8. A motor control apparatus comprising: a subordinate control apparatus comprising: a first communication circuit having: a first transistor forming an open collector circuit; a first controller connected to a base terminal included in the first transistor and configured to output a gate signal, that turns on/off the first transistor, to the base terminal; a first detector connected to a collector terminal included in the first transistor and configured to detect a collector voltage generated in the collector terminal; and a voltage dividing resistor provided between an emitter terminal included in the first transistor and the collector terminal, the first communication circuit transmits the collector voltage of the open collector circuit as an output signal, and the first detector detects the collector voltage when the first controller outputs the gate signal turning off the first transistor to the base terminal; a motor; and a driver configured to drive the motor; a host control apparatus including a second communication circuit having: a pull-up resistor, one terminal of the pull-up resistor connected to the collector terminal; a comparator including: an input terminal connected to the collector terminal and the one terminal; and an output terminal for outputting the output signal as a pulsed pulse input signal including an H signal and an L signal, wherein a predetermined threshold voltage and the voltage of the output signal transmitted via the input terminal are compared and the output signal transmitted from the first communication circuit is output as a result of a comparison between the predetermined threshold voltage and the voltage of the output signal; a second detector connected to the output terminal and configured to receive the pulse input signal output by the comparator; a second controller configured to output a predetermined value; and a variable voltage convertor connected to the pull-up resistor in parallel, having a resistor string with a resistance value changed in accordance with the predetermined value, and configured to convert the predetermined value to a pull-up voltage not lower than the threshold voltage, and transfer the converted pull-up voltage to the one terminal included by the pull-up resistor, the second communication circuit operable to receive the output signal; and a single signal line for connecting the collector terminal that the first communication circuit has, and the one terminal that the second communication circuit has, wherein the host control apparatus converts a motor rotation command to a voltage signal to output the voltage signal to the subordinate control apparatus via the signal line, and the subordinate control apparatus drives the motor via the driver, based on the input motor rotation command, and converts motor actual-rotation information to a pulse signal to output the pulse signal to the host control apparatus via the signal line.

* * * * *